United States Patent
Akif et al.

(10) Patent No.: US 12,240,314 B2
(45) Date of Patent: Mar. 4, 2025

(54) AIR FLAP SYSTEM

(71) Applicant: Bayerische Motoren Werke Aktiengesellschaft, Munich (DE)

(72) Inventors: Oeztzan Akif, Munich (DE); Christian Hack, Schweitenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 427 days.

(21) Appl. No.: 17/597,200

(22) PCT Filed: Jul. 21, 2020

(86) PCT No.: PCT/EP2020/070558
§ 371 (c)(1),
(2) Date: Dec. 29, 2021

(87) PCT Pub. No.: WO2021/013835
PCT Pub. Date: Jan. 28, 2021

(65) Prior Publication Data
US 2022/0305904 A1 Sep. 29, 2022

(30) Foreign Application Priority Data
Jul. 23, 2019 (DE) ............. 10 2019 119 936.0

(51) Int. Cl.
*B60K 11/08* (2006.01)
*B60K 11/06* (2006.01)
*F01P 1/00* (2006.01)

(52) U.S. Cl.
CPC ............ *B60K 11/085* (2013.01); *B60K 11/06* (2013.01); *F01P 2001/005* (2013.01)

(58) Field of Classification Search
CPC ... B60K 11/085; B60K 11/06; F01P 2001/005
See application file for complete search history.

(56) References Cited

U.S. PATENT DOCUMENTS 9,096,278 B2 * 8/2015 Lee .................. B62D 35/00
9,828,036 B2 * 11/2017 Frayer ............... H01Q 1/3233
(Continued)

FOREIGN PATENT DOCUMENTS

CN 104175988 A 12/2014
CN 206615186 U * 11/2017 ......... B60K 11/085
(Continued)

OTHER PUBLICATIONS

International Search Report (PCT/ISA/210) issued in PCT Application No. PCT/EP2020/070558 dated Jan. 27, 2021 with English translation (nine (9) pages).
(Continued)

*Primary Examiner* — James A Shriver, II
*Assistant Examiner* — Nicholas R. Kandas
(74) *Attorney, Agent, or Firm* — Crowell & Moring LLP (57) ABSTRACT

An air flap system for controlling air ingress into a motor vehicle has at least one air flap, which can be pivoted between an open position and a closed position, and an actuator, which is coupled to the air flap, such that the actuator is suitable for effecting the pivoting of the air flap. The actuator is arranged off-center in a central region with respect to one extent of the air flap system along a transverse axis of the vehicle. The central region is one of at least three regions which are arranged adjoining one another along the extent, the central region being arranged centrally with respect to the extent.

13 Claims, 7 Drawing Sheets

(56) References Cited

U.S. PATENT DOCUMENTS

| | | | |
|---|---|---|---|
| 10,274,027 B2* | 4/2019 | Matthews | |
| 11,167,636 B2* | 11/2021 | Morita | |
| 2012/0043146 A1 | 2/2012 | Schneider | |
| 2014/0346809 A1 | 11/2014 | Lee et al. | |
| 2017/0050509 A1 | 2/2017 | Aizawa et al. | |
| 2017/0144710 A1 | 5/2017 | Frayer et al. | |
| 2020/0055388 A1 | 2/2020 | Gerber et al. | |

FOREIGN PATENT DOCUMENTS

| | | |
|---|---|---|
| DE | 10 2013 110 467 A1 | 11/2014 |
| DE | 10 2014 108 575 A1 | 11/2014 |
| DE | 10 2016 009 097 A1 | 2/2017 |
| EP | 2 233 343 A2 | 9/2010 |
| FR | 3 064 551 A1 | 10/2018 |
| KR | 10 2013 0026875 A | 3/2013 |
| WO | WO 2015/001073 A1 | 1/2015 |

OTHER PUBLICATIONS

German-language Written Opinion (PCT/ISA/237) issued in PCT Application No. PCT/EP2020/070558 dated Jan. 27, 2021 with English translation (eight (8) pages).
English translation of Chinese-language Office Action issued in Chinese Application No. 202080050908.7 dated Dec. 13, 2023 (7 pages).

* cited by examiner

Section A-A

Fig. 8C

Section B-B

Section A-A

Fig. 9C

Section B-B

Fig. 9D

AIR FLAP SYSTEM

TECHNICAL FIELD

The present invention relates to an air flap system according to claim 1 for controlling the intake of air into a motor vehicle, to a method according to claim 12 for assembling an air flap system, and to a motor vehicle equipped with such an air flap system according to claim 13.

PRIOR ART

In motor vehicles nowadays, for aerodynamic reasons, air flap systems are provided in order to be able to control the intake of air into the motor vehicle actively by means of adjustable air flaps in the region of the radiator grille. The improvement in the aerodynamics of motor vehicles is one of the possibilities for reducing the fuel consumption and therefore the $CO_2$ emission of the motor vehicles. For example, closing the air flaps can cause the production of an air cushion in front of the radiator grille, which prevents or at least reduces swirling of the air. On the other hand, the intake of air or fresh air into the engine or the passenger compartment has to be possible at all times for obvious reasons. The air flaps are generally adjusted by an electric actuator.

It is known in principle to fasten air flap systems having integrated radar sensors rigidly in the vehicle frame. However, the problem occurs here that the integration of a radar sensor in the center of the vehicle with respect to a transverse axis of the vehicle is not possible since both the actuator of the air flap system and the radar sensor require a large amount of construction space.

BRIEF SUMMARY OF THE PRESENT INVENTION

The present invention is based on the object of specifying an improved air flap system for controlling the intake of air into a motor vehicle, an improved method for assembling such an air flap system, and a motor vehicle comprising such an air flap system. The intention here is to make more efficient use of the available construction space and also to enable a radar sensor to be arranged in a central position.

This object is achieved by an air flap system according to claim 1, a method according to claim 12, and a motor vehicle according to claim 13. Advantageous developments of the invention are the subject matter of the dependent claims.

An air flap system according to the invention for controlling the intake of air into a motor vehicle comprises
 at least one air flap which is pivotable between an open position and a closed position, and
 an actuator which is coupled to the air flap in such a manner that it is suitable for bringing about the pivoting of the air flap.

The actuator is arranged eccentrically (i.e., offset from a centerline of the vehicle) in a central region with respect to an extent of the air flap system along a transverse axis Y of the vehicle (i.e., perpendicular to the direction of travel).

The central region is one of at least three regions which are arranged adjacent to one another along the extent, wherein the central region is arranged centrally with respect to the extent.

The solution according to the invention makes it possible to reduce the dimensions along the longitudinal (i.e., in the direction of travel) and transverse (i.e., perpendicular to the direction of travel) axes of the vehicle. The available construction space can be used more efficiently. Shorter overhangs of the vehicle are therefore achieved, along with simultaneous maximum integration of the functions. Since the actuator is arranged eccentrically, the invention makes it possible for a radar sensor to be arranged in a central position.

In one embodiment of the air flap system, the actuator has a main drive shaft and a secondary drive shaft. The provision of a main drive shaft and a secondary drive shaft makes it possible in this embodiment for the eccentrically arranged actuator to be driven.

In a further embodiment of the air flap system, the air flap furthermore comprises a radar sensor for detecting an object. The main object of the radar sensor here is to detect third objects and to measure the object speed and position relative to the movement of the vehicle. The integration of the radar sensor in the air flap system is particularly advantageous here.

In a further embodiment of the air flap system, the air flap system is furthermore configured to receive a medium range radar sensor. Medium range radar sensors are conventionally used for realizing comfort and safety regulations, for example emergency braking systems or the like.

In a further embodiment of the air flap system, the air flap system is furthermore configured to receive a long range radar sensor. Long range radar sensors conventionally cover distances of up to 200 meters and speeds of between 30 and 250 km/h. This type of sensor is suitable in particular for increasing the vehicle safety.

In a further embodiment of the air flap system, the air flap system furthermore comprises an air flap system frame for receiving the long range radar sensor.

In a further embodiment of the air flap system, the air flap system furthermore comprises a medium range radar sensor adaptor for receiving the medium range radar sensor.

In a further embodiment of the air flap system, the air flap system frame is furthermore configured to receive the medium range radar sensor adaptor. This embodiment thereby makes it possible for both radar variants (medium range radar sensor and long range radar sensor) to be able to be installed in just one frame.

In a further embodiment of the air flap system, the actuator is controlled by an electric motor.

In a further embodiment of the air flap system, the actuator is arranged offset by 25 mm with respect to the transverse direction of the vehicle.

A method according to the invention for assembling an air flap system for controlling the intake of air into a motor vehicle comprises the following steps:
 providing at least one air flap which is pivotable between an open position and a closed position, and
 providing an actuator which is coupled to the air flap in such a manner that the actuator is suitable for bringing about the pivoting of the air flap.

In the method according to the invention, the actuator is arranged eccentrically in a central region with respect to an extent of the air flap system along a transverse axis of the vehicle.

The central region is one of at least three regions which are arranged adjacent to one another along the extent, wherein the central region is arranged centrally with respect to the extent.

The object mentioned at the beginning is also achieved by a motor vehicle which is equipped with the abovementioned air flap system. Accordingly, the same or similar advantages as described in conjunction with the above are also afforded, and therefore reference is made to the above embodiments in conjunction with the device according to the invention in order to avoid repetitions.

Some advantageous embodiments of the invention will be explained by way of example below with reference to the figures.

FIG. 6B shows the installation of the radar sensor shown in FIGS. 5A and 5B, wherein the radar sensor is a long range radar sensor.

Orientation details, such as, for example, "left", "right", "top" and "bottom" and also "vertically" and "horizontally" relate to an arrangement as is conventionally provided in motor vehicles located on a horizontal surface, without this being intended to constitute a limitation.

Figure 1:
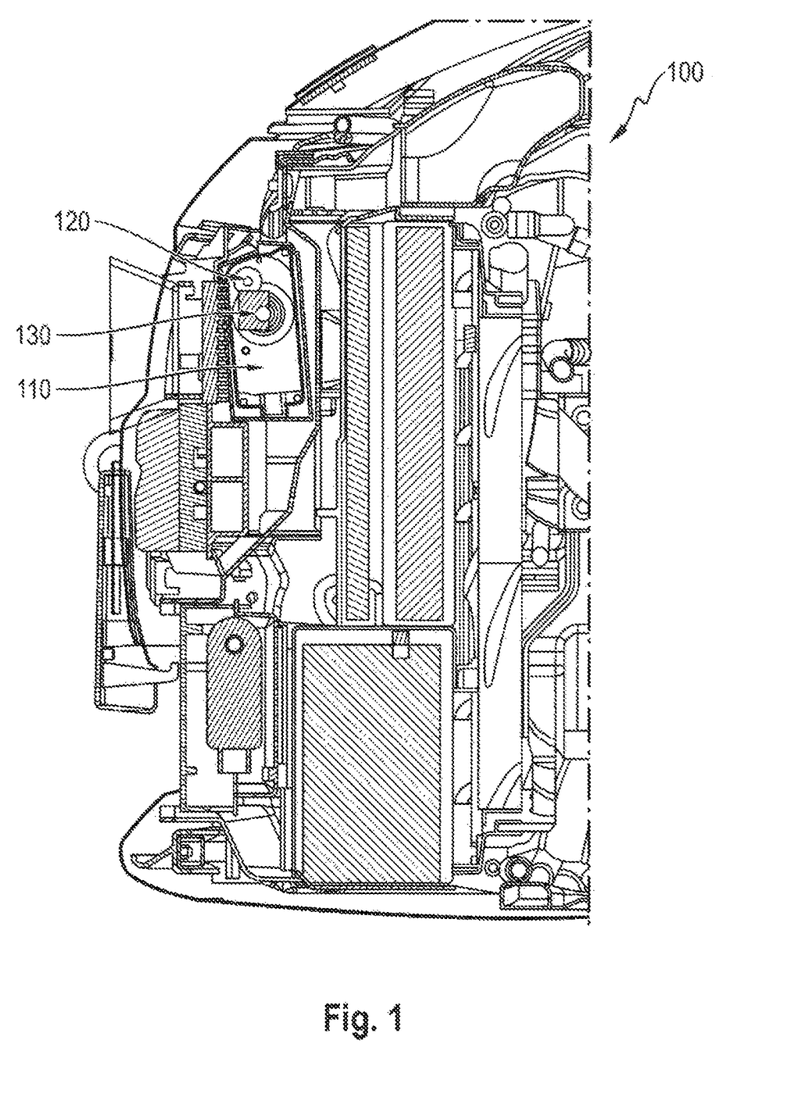
FIG. 1 shows a cross-sectional view of a motor vehicle front section along a sectional plane which is positioned centrally with respect to a transverse axis of the vehicle.

FIG. 1 shows a cross-sectional view of a motor vehicle front section along a sectional plane which is positioned centrally with respect to an extent of the air flap system (100) along a transverse axis Y of the vehicle (i.e., perpendicular to the direction of travel).

An air flap system 100 serves for controlling the intake of air into a motor vehicle and comprises at least one air flap 105 which is pivotable between an open position and a closed position, and an actuator 110 which is coupled to the air flap 105 in such a manner that it is suitable for bringing about the pivoting of the air flap 105.

The actuator 110 can be controlled, for example, by an electric motor.

The air flap 105 can be configured in such a manner that the transition between opening and closing takes place by rotating the air flap 105 about an axis of rotation running parallel to the transverse axis of the vehicle. However, the present invention is not restricted to the abovementioned embodiments. Similarly, a configuration of the air flap 105 in the form of one or more air flaps is also conceivable in such a manner that the transition between opening and closing takes place by rotating the one or more air flaps about an axis of rotation running parallel to the vertical axis of the vehicle.

Figure 2:
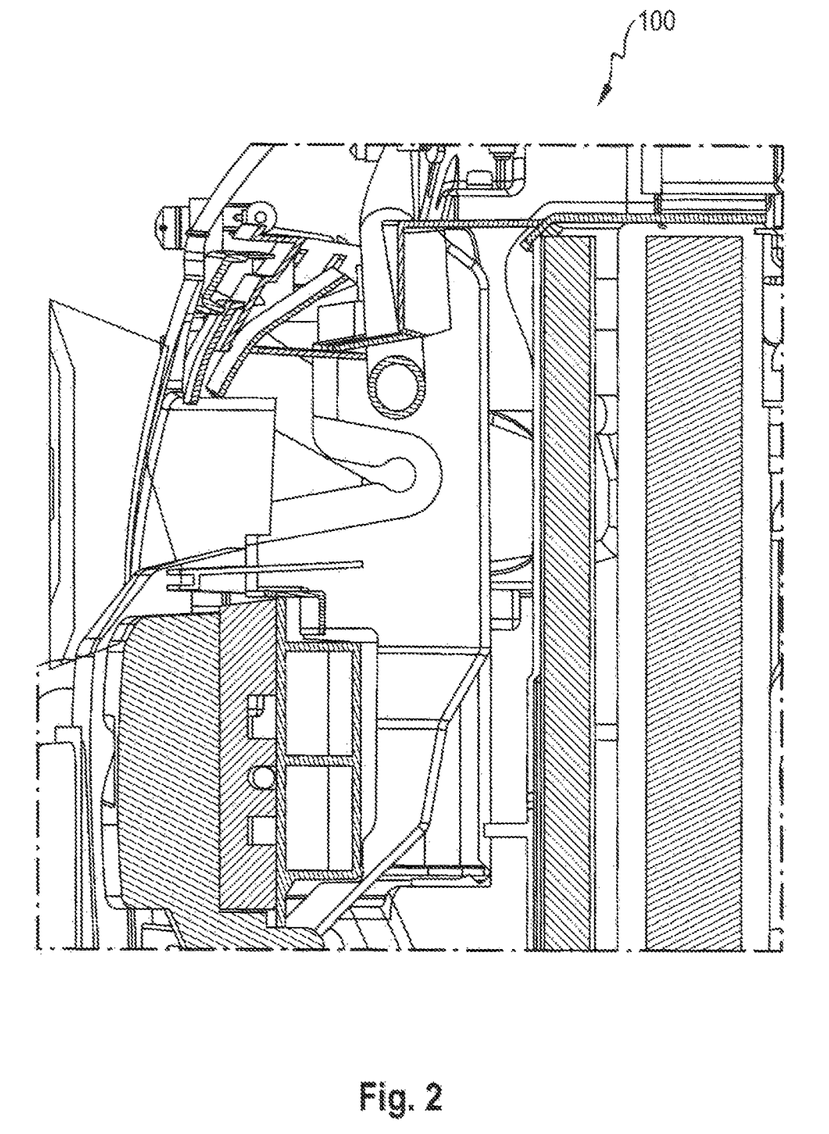
FIG. 2 shows a cross-sectional view of the motor vehicle front section along a sectional plane which is positioned offset by 20 cm with respect to the center of the transverse axis of the vehicle.

FIG. 2 shows a cross-sectional view of the motor vehicle front section along a sectional plane which is positioned offset by 20 cm with respect to the center of the transverse axis Y of the vehicle.

Figure 3:
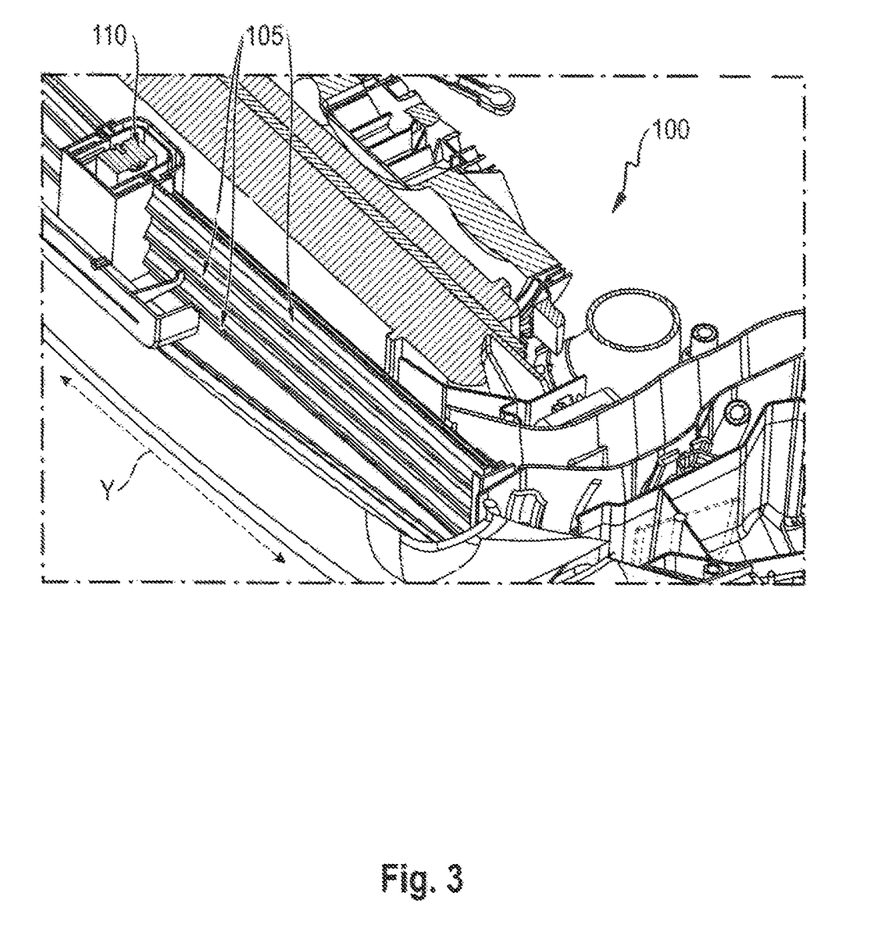
FIG. 3 shows a perspective illustration of an air flap system in the motor vehicle front section.

FIG. 3 shows a perspective illustration of the air flap system 100 in the motor vehicle front section.

In the embodiment of the air flap system 100 that is shown in FIG. 3, in each case three air flaps 105 are in each case provided on both sides of the actuator 110 with respect to the transverse axis Y of the vehicle. However, the present invention is not restricted to embodiments with three air flaps 105. On the contrary, embodiments with fewer or more air flaps are also conceivable.

Figure 4:
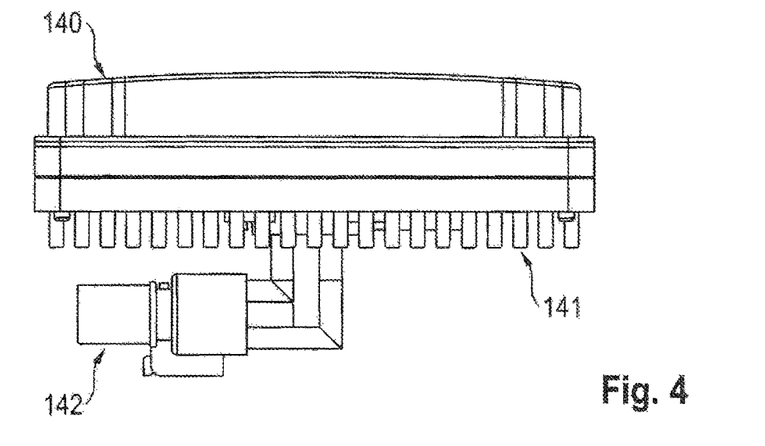
FIG. 4 shows a connection according to the invention of a radar sensor.

FIG. 4 shows a connection according to the invention of a radar sensor 140 to passive cooling elements 141 and to a centrally arranged cable connection 142. The passive cooling elements 141 serve for dissipating heat from the radar sensor 140 in order to make a preferred working temperature of the radar sensor 140 possible. The cable connection 142 serves for connecting the radar sensor 140 to a power supply (not shown). Integration of this arrangement in an air flap system according to the invention is possible centrally with respect to a transverse axis of the vehicle because of the eccentric arrangement of the actuator.

Figure 5A:
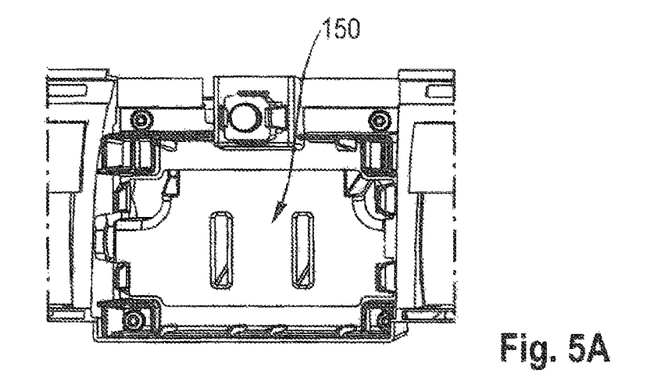
FIG. 5A shows a front side of the installation according to the invention of a radar sensor.

FIG. 5A shows a front side of the installation according to the invention of the radar sensor 140. The radar sensor 140 can comprise, for example, a medium range radar sensor 140A. Similarly, the radar sensor 140 can comprise, for example, a long range radar sensor 140B. The present invention is nevertheless not limited to medium range radar sensors or long range radar sensors. In principle, other types of radar sensors which can be used in embodiments of the present invention are also conceivable.

The air flap system 100 comprises an air flap system frame 150 for receiving the radar sensor 140. The air flap system frame 150 is preferably suitable both for embodiments with the medium range radar sensor 140A and also for embodiments with the long range radar sensor 140B. Since the medium range radar sensor 140A and the long range radar sensor 140B do not necessarily have the same dimensions, the use of an adaptor is required under some circumstances in order to suitably configure the air flap system frame 150 for both types of radar sensor.

Figure 5B:
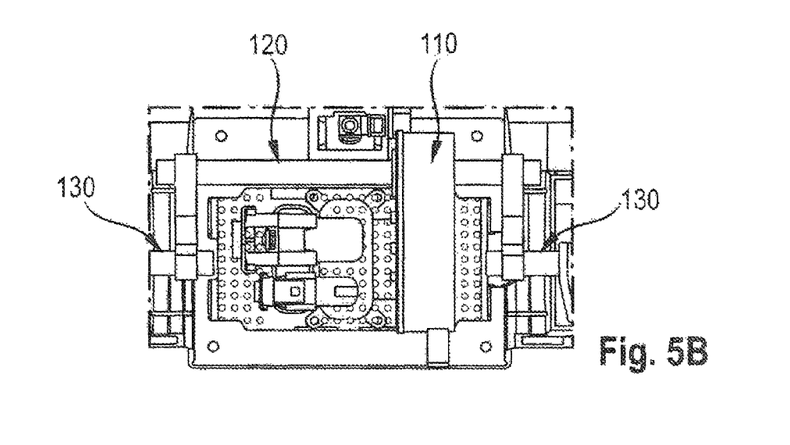
FIG. 5B shows a rear side of the installation according to the invention of a radar sensor.

FIG. 5B shows a rear side of the installation according to the invention of the radar sensor 140. The actuator 110 is arranged eccentrically with respect to the transverse axis Y of the vehicle. The actuator 110 can be arranged offset, for example, by 25 mm with respect to the transverse axis Y of the vehicle. However, the present invention is not restricted to embodiments in which the actuator 110 is arranged offset by 25 mm with respect to the transverse axis Y of the vehicle. Other offsetting distances are conceivable as long as they enable the radar sensor to be arranged centrally.

The actuator 110 has a main drive shaft 120 and a secondary drive shaft 130. The use of the main drive shaft 120 and the secondary drive shaft 130 makes it possible for the embodiment which is shown to in particular control the air flaps with the actuator 110 on both sides of the actuator 110 with respect to the transverse axis Y of the vehicle. In other words, one actuator suffices for two air flaps (arranged in each case on different sides of the center of the vehicle).

Figure 6A:
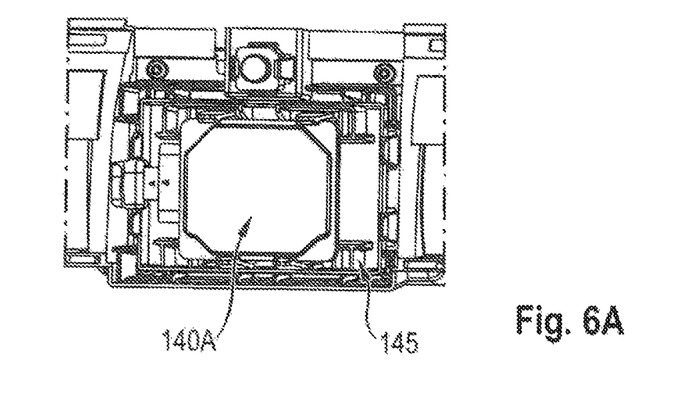
FIG. 6B shows the installation of the radar sensor shown in FIGS. 5A and 5B, wherein the radar sensor is a medium range radar sensor.

FIG. 6A shows the installation of the radar sensor 140 shown in FIGS. 5A and 5B, wherein the radar sensor 140 is a medium range radar sensor 140A.

The air flap system 100 comprises a medium range radar sensor adaptor 145 for receiving the medium range radar sensor 140A. The air flap system frame 150 is configured for receiving the medium range radar sensor adaptor 145. The embodiment which is shown thereby makes the use of a single air flap system frame 150 possible for different types of radar sensor.

The present invention is not restricted to the use of an adaptor for medium range radar sensors. On the contrary, it is intended to be made possible by the use of adaptors that only one type of air flap system frame 150 is used, irrespective of the type of radar sensor to be installed.

Figure 6B:
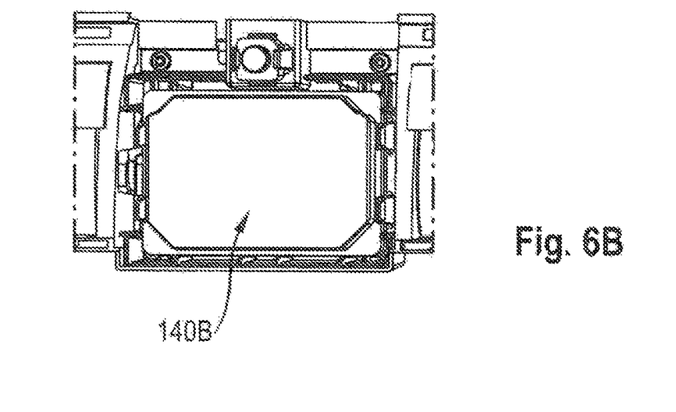

FIG. 6B shows the installation of the radar sensor 140 shown in FIGS. 5A and 5B, wherein the radar sensor 140 is a long range radar sensor 140B. The air flap system frame 150 is configured to receive the long range radar sensor 140B.

The present invention is not restricted to air flap system frames that are dimensioned for receiving long range radar sensors. The use of adaptors makes it possible for only one type of air flap system frame to be required, irrespective of the type of radar sensor to be installed. Typically, the dimensions of the air flap system frame are dimensioned in accordance with the dimensions of the "largest" radar sensor that will probably be used.

Figure 7:
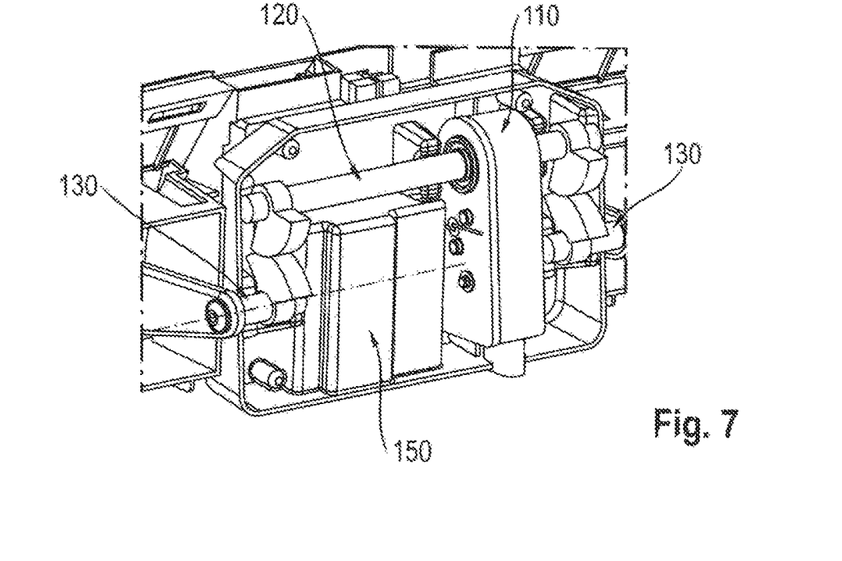
FIG. 7 shows a perspective illustration of a configuration of the actuator according to the invention with a main and secondary drive shaft.

FIG. 7 shows a perspective illustration of a configuration of the actuator 110 according to the invention with the main drive shaft 120 and the secondary drive shaft 130. The actuator 110 is arranged eccentrically with respect to an extent of the motor vehicle along the transverse axis Y of the vehicle in a central region of the extent.

The central region is one of at least three regions which are arranged adjacent to one another along the extent, wherein the central region is arranged centrally with respect to the extent.

The use of the main drive shaft 120 and the secondary drive shaft 130 makes it possible for the embodiment which is shown to in particular control the air flaps with the actuator 110 on both sides of the actuator 110 with respect to the transverse axis Y of the vehicle. In other words, one actuator suffices for two air flaps which are in each case arranged on different sides of the center of the vehicle.

Figure 8A:
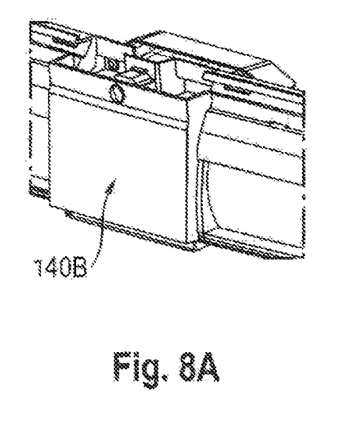
FIG. 8A shows a perspective illustration of the arrangement of a long range radar sensor in the air flap system according to the invention.

FIG. 8A shows a perspective illustration of the arrangement of the long range radar sensor 140B in the air flap system 100 according to the invention.

Figure 8B:
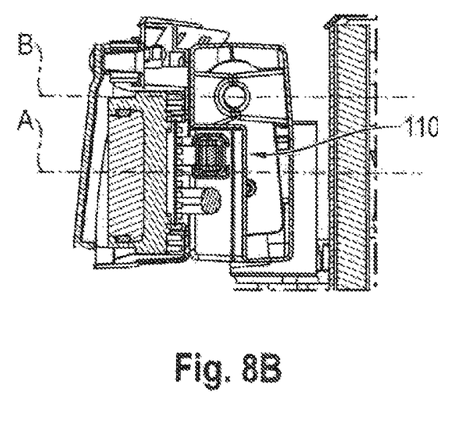
FIG. 8B shows a cross-sectional view of the arrangement of a long range radar sensor in the air flap system according to the invention.

FIG. 8B shows a cross-sectional view of the arrangement of a long range radar sensor in the air flap system 100 according to the invention.

Figure 8C:
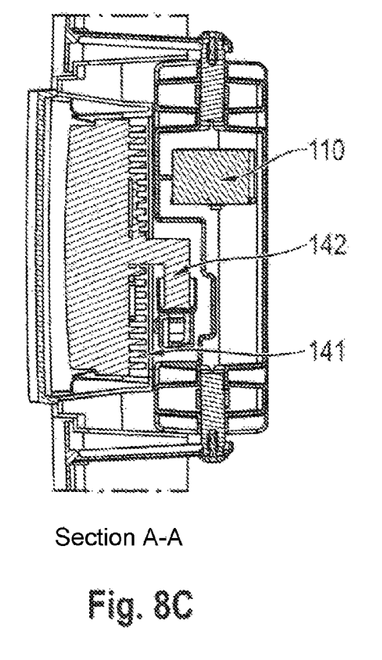
FIG. 8C shows a top view of the air flap system along the sectional line A in FIG. 8B.

FIG. 8C shows a top view of the air flap system along the sectional line A in FIG. 8B.

The passive cooling elements 141 serve for dissipating heat from the radar sensor 140B in order to make a preferred operating temperature of the radar sensor 140B possible. The cable connection 142 serves for connecting the radar sensor 140 to a power supply (not shown). The actuator 110 is arranged eccentrically in a central region with respect to the transverse axis Y of the vehicle. By means of the eccentric arrangement of the actuator 110, a central arrangement of the long range radar sensor 140B is possible.

Figure 8D:
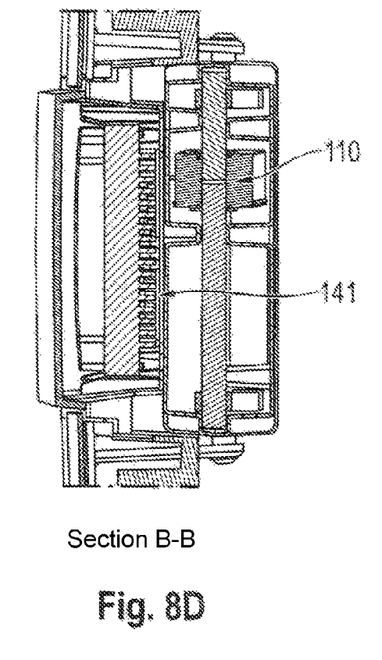
FIG. 8D shows a top view of the air flap system along the sectional line B in FIG. 8B.

FIG. 8D shows a top view of the air flap system along the sectional line B in FIG. 8B.

Figure 9A:
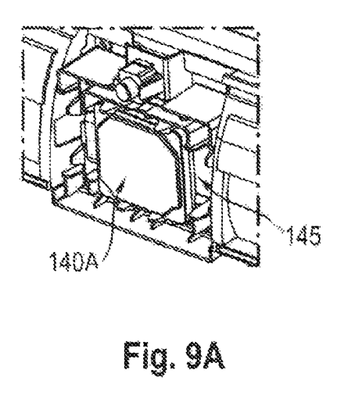
FIG. 9A shows a perspective illustration of the arrangement of a medium range radar sensor in the air flap system according to the invention.

FIG. 9A shows a perspective illustration of the arrangement of the medium range radar sensor 140A in the air flap system 100 according to the invention. In particular, the medium range radar sensor 140A can be arranged in the structurally identical frame to the long range radar sensor 140B because of the use of the medium range radar sensor adaptor 145.

Figure 9B:
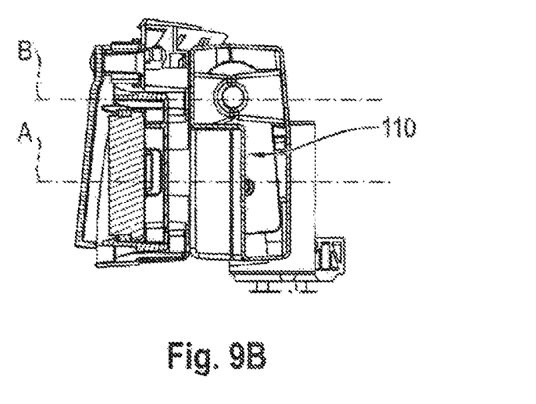
FIG. 9B shows a cross-sectional view of the arrangement of a long range radar sensor in the air flap system according to the invention.

FIG. 9B shows a cross-sectional view of the arrangement of a long range radar sensor in the air flap system according to the invention.

Figure 9C:
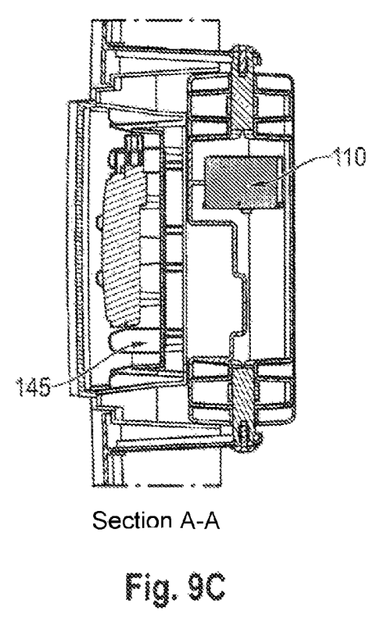
FIG. 9C shows a top view of the air flap system along the sectional line A in FIG. 9B.

FIG. 9C shows a top view of the air flap system along the sectional line A in FIG. 9B. The actuator 110 is arranged eccentrically with respect to an extent of the motor vehicle along the transverse axis Y of the vehicle in a central region of the extent with respect to the transverse axis Y of the vehicle. By means of the eccentric arrangement of the actuator 110, a central arrangement of the medium range radar sensor 140A is possible.

The central region is one of at least three regions which are arranged adjacent to one another along the extent, wherein the central region is arranged centrally with respect to the extent.

Figure 9D:
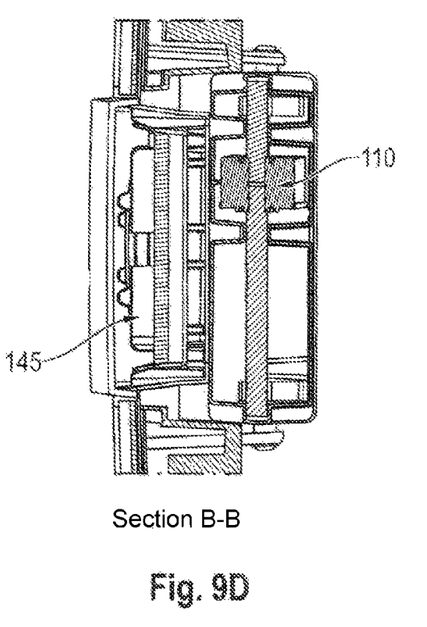
FIG. 9D shows a top view of the air flap system along the sectional line B in FIG. 9B.

FIG. 9D shows a top view of the air flap system along the sectional line B in FIG. 9B.

A method according to the invention for assembling the air flap system 100 for controlling the intake of air into a motor vehicle comprises the following steps:

providing at least one air flap 105, providing an actuator 110, wherein the actuator 110 is arranged eccentrically in a central region with respect to the transverse axis Y of the vehicle.

The central region is one of at least three regions which are arranged adjacent to one another along the extent, wherein the central region is arranged centrally with respect to the extent.

A motor vehicle according to the invention comprises in particular the air flap system 100.

It goes without saying that in the present invention there is a relationship between firstly features which have been described in conjunction with method steps and also secondly features which have been described in conjunction with corresponding devices. Therefore, described method features are also to be considered to be device features which belong to the invention—and vice versa—even if this has not been explicitly stated.

It should be noted that the features of the invention described with reference to individual embodiments or variants, such as for example type and configuration of the individual air flaps and actuators, and the spatial arrangement thereof, can also be present in other embodiments, unless stated otherwise or automatically ruled out for technical reasons. In addition, all features of features of this kind, described in combination, of individual embodiments do not necessarily always have to be realized in a respective embodiment.

What is claimed is:

1. An air flap system for controlling intake of air into a motor vehicle, comprising:
   at least one air flap which is pivotable between an open position and a closed position;
   an actuator which is coupled to the air flap in such a manner that the actuator is suitable for bringing about the pivoting of the air flap, wherein
   the actuator is eccentrically arranged, offset from a center line of the vehicle, in a central region with respect to an extent of the air flap system along a transverse axis of the vehicle, the offset creating a space sufficient to receive a sensor arranged in a middle portion of the central region, adjacent the actuator,
   a radar sensor for detecting an object, the radar sensor position in the space, and
   the central region is one of at least three regions which are arranged adjacent to one another along the extent, the central region being arranged centrally with respect to the extent.

2. The air flap system according to claim 1, wherein the actuator has a main drive shaft and a secondary drive shaft, both arranged parallel to the transverse axis of the vehicle.

3. The air flap system according to claim 1, wherein the air flap system is configured to receive a medium-range radar sensor in the space.

4. The air flap system according to claim 1, wherein the air flap system is configured to receive a long-range radar sensor in the space.

5. The air flap system according to claim 4, further comprising:
   an air flap system frame for receiving the long-range radar sensor in the space.

6. The air flap system according to claim 3, further comprising:
   a medium-range radar sensor adaptor for receiving the medium-range radar sensor in the space.

7. The air flap system according to claim 6, further comprising:
   an air flap system frame for receiving the medium-range radar sensor adaptor in the space.

8. The air flap system according to claim 1, wherein the actuator is controlled by an electric motor, wherein the electric motor is arranged in the central region.

9. The air flap system according to claim 1, wherein the actuator is arranged offset by 25 mm with respect to the transverse axis of the vehicle.

10. The air flap system according to claim 1, wherein a length of the central region along the transverse axis of the vehicle is no more than 150 cm.

11. The air flap system according to claim 1, wherein a length of the central region along the transverse axis of the vehicle is no more than 100 cm.

12. The air flap system according to claim 1, wherein a length of the central region along the transverse axis of the vehicle is no more than 50 cm.

13. A motor vehicle comprising an air flap system according to claim 1.

* * * * *